INVENTORS
JAMES A. FINNERAN
HAYES C. MAYO

John C. Quinlan
Dan H. Phillips
ATTORNEYS

United States Patent Office 3,350,170
Patented Oct. 31, 1967

3,350,170
PROCESS FOR CARRYING OUT CYCLIC SYNTHE-
SIS REACTIONS AT ELEVATED PRESSURES
James A. Finneran, Garden City, and Hayes C. Mayo,
Huntington, N.Y., assignors to Pullman Incorporated,
Chicago, Ill., a corporation of Delaware
Filed Oct. 29, 1965, Ser. No. 505,653
10 Claims. (Cl. 23—199)

ABSTRACT OF THE DISCLOSURE

The present invention relates to an improved process for carrying out cyclic synthesis reactions at elevated pressures, and more particularly, to improvements in the method of compressing fresh and recycle synthesis gases in such process. The invenention is particularly applicable to the synthesis of ammonia from nitrogen and hydrogen, and for purposes of illustration is here discussed in that context.

---

Figure 1:
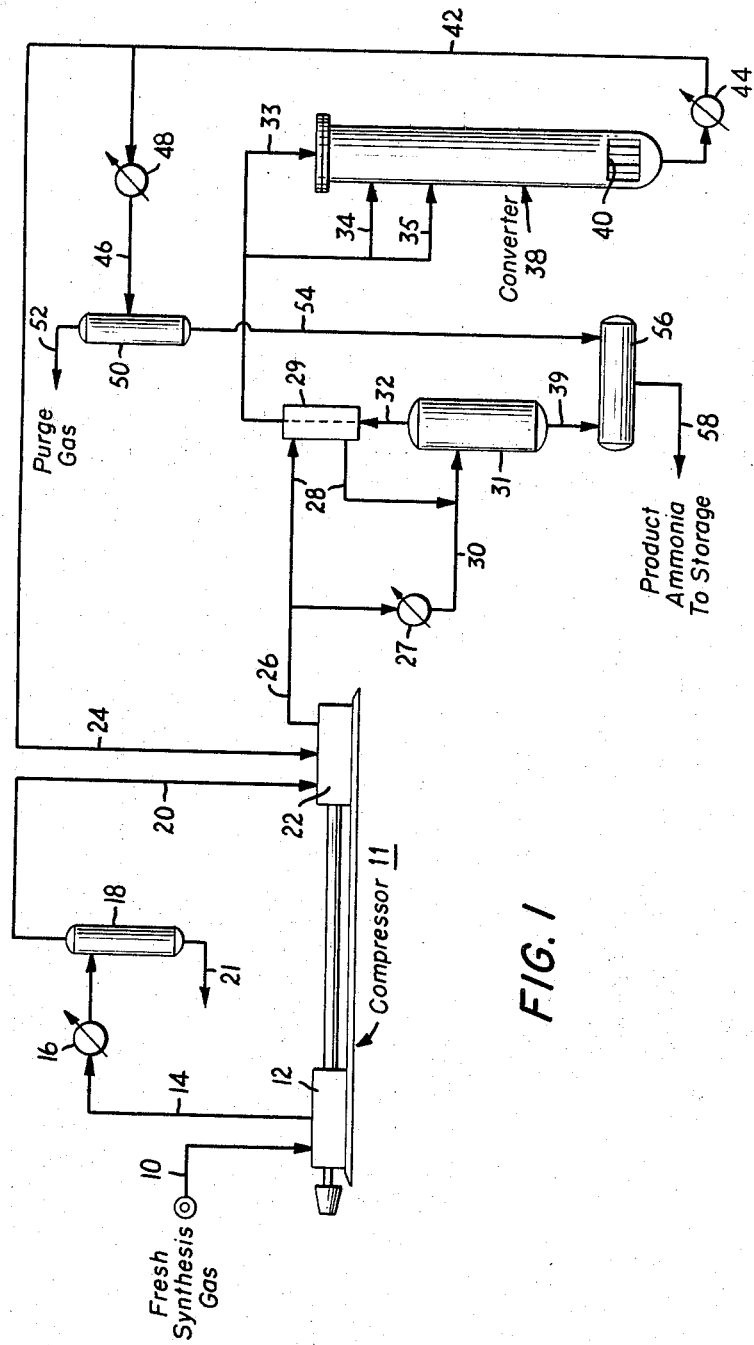

The prior art method for the synthesis of ammonia from synthesis gas containing nitrogen and hydrogen involves compressing fresh synthesis gas from the relatively low pressure at which it is generated (atmospheric pressure up to a few hundred p.s.i.g.) to the relatively high pressure at which it is contacted over the synthesis catalyst (ranging from the minimum of about 1500 p.s.i.g. up to a maximum of about 20,000 p.s.i.g., depending upon the particular synthesis process used). The compressed fresh synthesis gas is combined with compressed recycle synthesis gas and may be chilled to condense and allow separation of some of the ammonia product in the combined gases. The remaining chilled gas is then preheated to reaction temperature (500 to 1000° F.) and contacted over one or more beds of catalyst to obtain partial conversion of the nitrogen and hydrogen to ammonia. The resulting gas containing ammonia is cooled by heat exchange with the feed gas to preheat the latter and may be further chilled to condense and allow separation of some of the product ammonia. In any case, all or a major portion of the product gas containing some ammonia is compressed in a booster compressor before being recycled to join the fresh synthesis gas. Booster compression may be used to overcome the pressure drop in the conversion system or so-called "synthesis loop" which normally amounts to between about 100 and about 500 p.s.i. A minor portion of the recycle synthesis gas is normally purged from the loop to prevent the build-up of various gases therein which are inert in the reaction, namely, methane, argon and other rare gases.

The fresh synthesis gas normally contains small amounts of carbon dioxide, usually about 1–10 p.p.m. Since carbon dioxide is known to react under certain conditions with ammonia to form solid ammonium carbamate and, if water is also present, solid ammonium carbonate and/or solid ammonum bicarbonate, and since any solids formed would tend to accumulate in the squipment, care must be taken to employ conditions at which the aforesaid reaction products cannot form or to accommodate them if formed in a way which will not force interruption of operations. In the case of the prior art method described above, solids can only be formed upon combining the compressed fresh synthesis gas containing the carbon dioxide with the compressed recycle synthesis gas containing ammonia. Since the combined gases, after chilling, are introduced into a liquid separator, any solids formed are withdrawn therefrom along with the liquid product ammonia and operating difficulties are minimized.

Many synthetic ammonia plants currently being designed, constructed and brought into operation are of large design capacity, for example, nominal capacities of 600 tons of ammonia per day and more. The relatively large volume of synthesis gas required to be compressed in such plants justifies the use of centrifugal compressors for raising synthesis gas pressure up to as high as about 5000 p.s.i.g., depending upon plant capacity and economic criteria. Such pressures are achieved in a centrifugal machine by means of a plurality of impellers or wheels on the shaft of the machine. Unfortunately, however, the volume contraction which occurs in the course of the passage of the gas through the machine is such that the last wheel or wheels may not be fully loaded, thus creating a difficult design problem and possible inefficiency and instability.

One object of the invention is to provide an improved process for the synthesis of ammonia from nitrogen and hydrogen.

Another object of the invention is to reduce investment and operating costs of plants for the production of synthetic ammonia.

Still another object of the invention is to improve the efficiency of compressing both fresh and recycle synthesis gas in connection with the synthesis of ammonia.

A further object of the invention is to provide an improved synthetic ammonia process which minimizes the problem of the formation of solid products of the reactions of ammonia with carbon dioxide.

Figure 2:
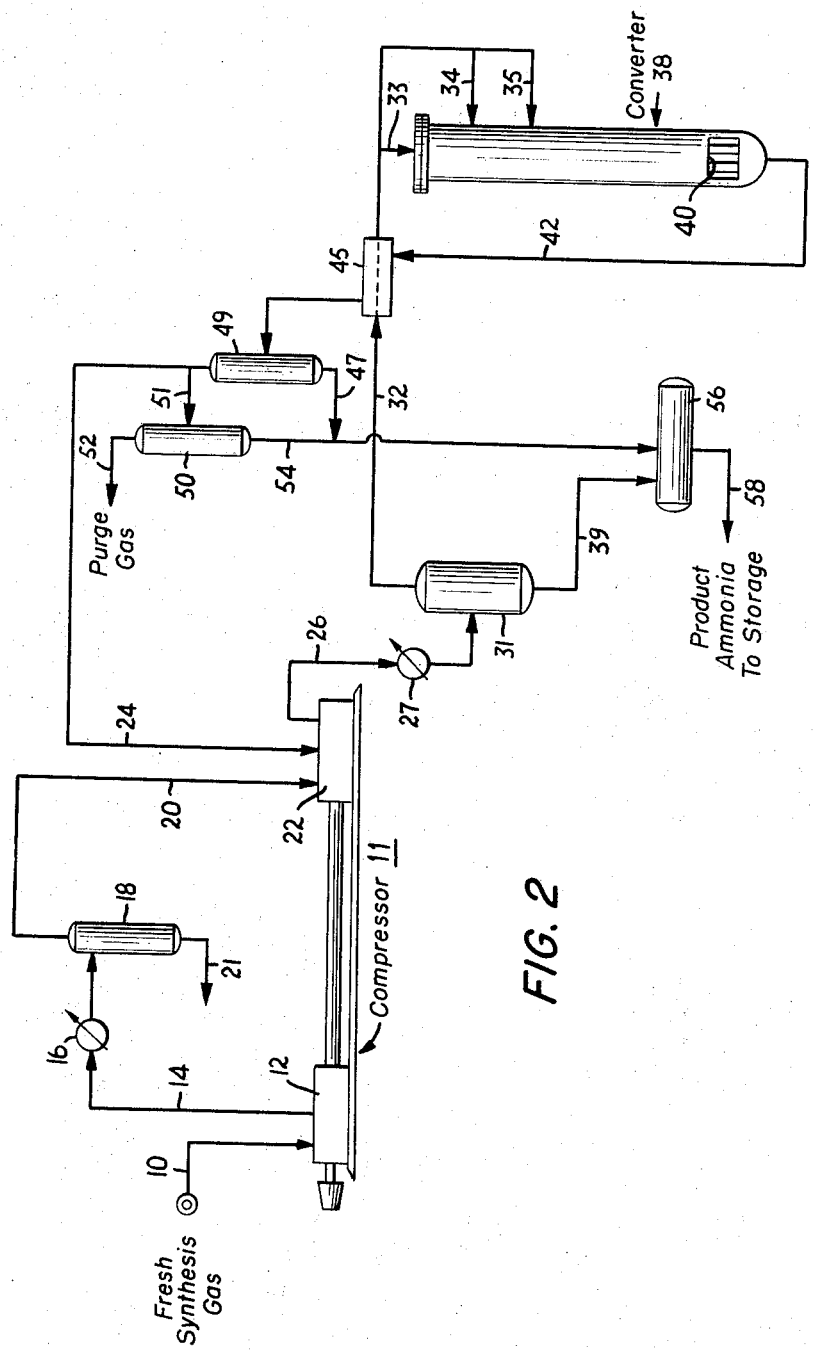

Various other objects and advantages of the invention will be apparent to those skilled in the art from the following detailed discussion and description, taken with the accompanying drawing in which:

FIGURE 1 is a diagrammatic illustration of suitable equipment for carrying out one preferred embodiment of the invention; and FIGURE 2 is a similar diagrammatic illustration of suitable equipment for carrying out another preferred embodiment of the invention.

The foregoing objects are achieved in accordance with the invention by a combination of steps comprising contacting synthesis gas containing nitrogen and hydrogen in the presence of the catalyst in a conversion zone to produce ammonia by reaction of a part of the synthesis gas, then admixing effluent of the conversion zone, which constitutes the recycle synthesis gas, with fresh synthesis gas, compressing the resulting admixed gases, separating ammonia therefrom and introducing the compressed admixed gases from which ammonia has been separated into the conversion zone. Thus, recycle synthesis gas is admixed with partially compressed fresh synthesis gas and the admixed gases are compressed together, thereby allowing elimination of the booster compressor heretofore used for the recycle synthesis gas. It will be appreciated that elimination of the booster compressor is reflected in a large saving in the initial installed cost of the plant. The conditions at which the fresh and recycle synthesis gases are admixed are selected to preclude the formation of solid products of the reactions of carbon dioxides and ammonia.

In the case of plants which utilize centrifugal compressors for compression of ammonia synthesis gas, the object of improving the efficiency of compressing admixed recycle and fresh synthesis gas is achieved by compressing the admixed gases in a common centrifugal compressor. This is achieved by introducing the recycle synthesis gas into the compressor in which the fresh synthesis gas is being compressed, at a sidestream inlet immediately upstream from the last wheel or wheels of the plurality of wheels mounted on the shaft of the machine. The volume of gas thus added to the last wheel or wheels compensates for contraction of the volume of fresh gas as it passes through the machine and thus prevents under loading of the last wheel or wheels which could cause machine instability and inefficiency.

The method of the invention is applicable independently of the source of synthesis gas and the process by which the synthesis gas is prepared. The invention is equally applicable to utilization of synthesis gas prepared from any of the many known feed stocks by any of the processes associated therewith. Some examples of commonly used feed stock are natural gas, light distillate, naphtha and refinery gases; some associated processes are steam reforming, partial oxidation and low temperature purification. Synthesis gas, consisting essentially of hydrogen and nitrogen in a mol ratio of about 3:1 is purified before being charged to the ammonia synthesis process by removal or reduction to tolerable levels of contaminants such as carbon, oil vapors, unsaturated hydrocarbons, sulfur compounds, water and carbon oxides which can poison catalysts or solidify and foul equipment. In addition to these equipment fouling and catalyst poisoning contaminants, the synthesis gas also contains gases such as methane, helium and argon, which, while they do not poison the synthesis catalyst or foul equipment, must be prevented from accumulating in the synthesis circuit to such an extent that their presence appreciably reduces the partial pressure of the reactant gases, i.e., hydrogen and nitrogen, and thereby decreases the rate of reaction. Accumulation of these gases (e.g., methane, helium and argon) which are inert to the ammonia synthesis reaction is prevented by purging the synthesis system in proportion to the rate of introduction of these inert gases via the fresh synthesis gas.

The concentration of inert, non-catalyst poisoning gases such as methane, helium and argon in the fresh synthesis gas usually ranges from about 0.4 to about 2.0 percent. Carbon oxides (which are catalyst poisoning gases) are reduced to as low a concentration in the fresh synthesis gas as is economically possible, before the fresh synthesis gas is provided to the ammonia synthesis system. Carbon oxides are thus usually present in the purified fresh synthesis gas to the extent of about 5 p.p.m. to about 10 p.p.m., although the concentration of carbon oxides may, in some cases, be as low as 1 p.p.m. The purified synthesis gas, usually containing about 0.4 to about 2.0 percent of inerts and about 5 p.p.m. to about 10 p.p.m. of carbon oxides, is usually provided to the ammonia synthesis system at a pressure of about 100 p.s.i.g. to about 750 p.s.i.g.

Reference is now made to FIGURE 1 of the drawings for a detailed description and example of a preferred embodiment of the invention. Fresh synthesis gas containing nitrogen and hydrogen is introduced via line 10 into the first stage 12 of centrifugal compressor 11 and compressed to a first stage pressure of about 850 to about 950 p.s.i.g. First stage 12 contains 9 wheels. The compressed gas is passed via line 14 through cooling zone 16 where it is reduced in temperature to condense moisture present and thence into separator 18 where water is separated from the compressed gas and withdrawn via line 21.

Dried fresh synthesis gas at the first stage pressure and a temperature of about 40° F. to about 50° F. is withdrawn from separator 18 and passed via line 20 to the second stage 22 of centrifugal compressor 11. The second stage 22 contains 9 wheels. Recycle synthesis gas, obtained as hereinafter described, containing product ammonia, unreacted nitrogen and hydrogen, and small amounts of inert gases, is introduced via line 24 into a sidestream inlet of second stage 22 and admixed with the fresh synthesis gas from the wheel next preceding the sidestream inlet at an intermediate pressure of about 1200 to about 3000 p.s.i.g. The fresh synthesis gas emerging from the wheel next preceding the sidestream inlet is at a temperature of about 225° F. to about 325° F. The recycle synthesis gas is at a temperature of about 85° F. to about 185° F. The resultant admixed gases are at a temperature of about 100° F. to about 180° F. as they enter the final wheel or wheels of second stage 22. The admixed fresh and recycle synthesis gases are compressed in the final wheel or wheels of second stage 22 to a final pressure of about 1400 to about 3200 p.s.i.g. and a final temperature of about 100° F. to about 225° F. The admixed compressed gaseous stream is withdrawn via line 26.

The recycle synthesis gas introduced to second stage 22 via line 24 has undergone a pressure drop of about 150 to about 250 p.s.i. in its passage through the synthesis loop and is consequently at a pressure of about 1200 to about 3000 p.s.i.g., as stated above. The point of sidestream entry into second stage 22 is selected so that the recycle gas is introduced at a location where the pressure within the second stage is the same or only slightly less than the recycle synthesis gas pressure, this stage usually occurring at the last wheel or wheels of the machine. This conserves the recycle gas pressure and maintains full loading of the last wheel or wheels. Neither the specific number of wheels contained in the two stages of the compressor nor the pressure or capacity limits of the compressor form any part of the invention and, along with other features such as wheel side wall area, annular passage configuration, etc., are merely matters of mechanical design of the compressor. It will also be understood that the compressor can be divided into a greater or lesser number of stages than the two stages of this example, the exact number depending on the total pressure differential necessary and on mechanical considerations. It will be still further understood that the invention is not limited to centrifugal compressors or to compressors of any particular design, but may be practiced with any type of compressor, including reciprocating compressors.

A portion of the compressed, admixed gases in line 26 is diverted through line 28 and used to preheat gas feed to the converter in heat exchange zone 29. The remainder of the admixed gases is reduced in temperature in cooling zone 27 to condense ammonia present, recombined in line 30 with the cooled gas withdrawn from heat exchange zone 29, and the recombined cooled gases introduced into separation zone 31, where ammonia is separated as liquid from the gaseous stream containing unreacted synthesis gas and small amounts of impurities. Carbon dioxide introduced in the makeup synthesis gas is also separated from the gaseous stream and removed with the liquid ammonia. The separated liquid ammonia containing the carbon dioxide also separated from the gaseous stream is passed via line 39 to holding tank 56 from which it is withdrawn as product via line 58. The uncondensed fraction from separation zone 31, from which carbon dioxide and a portion of the ammonia has been removed, is withdrawn through line 32, preheated in heat exchange zone 29 as described above and introduced through line 33 into converter 38 which encloses a plurality of catalyst beds (not shown) and a heat exchanger 40. A major portion of the synthesis gas passes by means of a down pipe (not shown) within the converter through heat exchanger 40, also within the converter, in indirect heat exchange with hot product gases and is thus preheated to the desired temperature for initiating reaction. The preheated gas then passes through the catalyst beds in series, the gas being heated by reason of the exothermic reaction of nitrogen and hydrogen to form ammonia taking place in each of the beds. The small amounts of methane, helium, argon and carbon dioxide present as impurities in the synthesis gas are inert in the ammonia synthesis reaction. Temperature is controlled by injecting a minor portion of the relatively cool feed gas diverted from line 33 between the catalyst beds through lines 34 and 35. Only two such lines are shown, there being more or less depending on the number of catalyst beds. The hot gases effluent of the last of the series of catalyst beds then passes through heat exchanger 40 in indirect heat exchange with the incoming gas as aforesaid.

The specific internal configuration of the converter, the number of catalyst beds, the temperature control technique used, the specific conditions of converter operation and the catalyst used therein form no part of this invention. The invention is equally applicable to any of the many known configurations, temperature control techniques, operating conditions and catalysts. Reference is made to a chapter entitled "Production of Synthetic Ammonia" in the book "Fertilizer Nitrogen—Its Chemistry and Technology" edited by Vincent Sauchelli, Reinhold Publishing Corporation, 1964, for further information regarding the various commercially important converter designs.

The hot product gaseous stream withdrawn from heat exchanger 40 of converter 38 is passed through line 42 to one or more heat exchangers, represented generally by cooling zone 44. The cooled gas is withdrawn and a major portion thereof, which constitutes the recycle synthesis gas hereinabove referred to, is introduced via line 24 into second stage compressor 22. About 15 to about 25% of the synthesis gas mixture of hydrogen and nitrogen is converted to ammonia in the converter. The recycle stream containing unreacted synthesis gas is therefore about 4 to about 7 times as large as the fresh synthesis gas stream fed into the process. The invention is equally applicable to any degree of conversion and resultant ratio of recycle to fresh synthesis gas. A minor portion of the gas withdrawn from the converter is diverted through line 46, reduced in temperature in cooling zone 48 to condense ammonia present and introduced into separator 50 where liquid ammonia is separated from unreacted synthesis gases and gases inert to the conversion reaction. The ammonia so separated is withdrawn via line 54 to holding tank 56, while the unreacted and inert gases are purged from the process via line 52 in order to prevent the accumulation of inerts in the system. Refrigeration can be recovered from this purge gas and it can then be used as fuel gas or for other purposes. The amount of gas purged is thus controlled to remove the same quantity of inert gases from the system as is introduced in the fresh feed gas.

Having thus described the operation of FIGURE 1 in general terms, reference is now made to a specific example thereof, including operating conditions, flow rates and composition of key streams.

EXAMPLE I

First stage 12 and second stage 22 each contains nine compression wheels. Recycle synthesis gas is introduced between the eighth and ninth wheels of second stage 22.

It will be recognized by those skilled in the art that numerous valves, pumps, controls and other standard devices necessary for operation of the process are not shown in the drawings or set forth in the accompanying discussion. Since the locations and functions of such devices are well known, they have been omitted for the sake of clarity and simplicity.

As previously stated, ammonia in the recycle gas and carbon dioxide in the fresh synthesis gas will, under certain conditions, react to form solid ammonium carbamate and, in the presence of water, to form the carbonate and bicarbonate. To insure efficient and economical operation, a preferred embodiment of the invention requires the maintenance of conditions such that formation of solids in the compression equipment is precluded, since even small amounts of solids deposited on the blades of a centrifugal compressor or within the cylinders of a reciprocating compressor may require interruption of operation and may damage the machine. Qualitatively, increasing temperature and decreasing pressure militate against solids formation, since either change will favor the decomposition of the solid carbamate into its gaseous constituents, i.e., carbon dioxide and ammonia, in accordance with the following reaction (1) $NH_4CO_2NH_2$ (solid) $= 2NH_3$ (gas) $+ CO_2$ (gas)

At low concentrations of ammonia and carbon dioxide in a gaseous mixture, their partial pressures may be represented as follows:

(2) $\qquad P_{NH_3} = (X_{NH_3})(P)$ (3) $\qquad P_{CO_2} = (X_{CO_2})(P)$ where $P_{NH_3}$ is the partial pressure of ammonia,
$P_{CO_2}$ is the partial pressure of carbon dioxide,
$X_{NH_3}$ is the mol fraction of ammonia,
$X_{CO_2}$ is the mol fraction of carbon dioxide and
P is the total pressure of the mixture.

In accordance with the mass action principle the extent of carbamate formation from Equation 1 is dependent upon the value of K in the expression (4) $\qquad K = (P_{NH_3})^2 P_{CO_2}$ It has been found from experience that the formation of solids will not occur if the value of K, as calculated from Equation 4, is maintained at or below a specific maximum value for any given temperature. A series of empirically determined sets of temperature and corresponding maximum K value are represented in Table A below, with K calculated from partial pressures expressed in p.s.i.a., and the temperature expressed in degrees Fahrenheit. Each

TABLE I

| Ref. Fig. 1 | Press., p.s.i.g. | Temp., °F. | Flow Rate, lbs./hr. | Mol Percent N₂ | Mol Percent H₂ | Mol Percent NH₃ | Mol Percent inerts | Vol., p.p.m. CO₂ |
|---|---|---|---|---|---|---|---|---|
| 10 [1] | 353 | 100 | 56,361 | 24.6 | 73.8 | 0 | 1.6 | 5 |
| 14 [1] | 906 | 345 | 56,361 | 24.6 | 73.8 | 0 | 1.6 | 5 |
| 20 | 896 | 46 | 55,533 | 24.6 | 73.8 | 0 | 1.6 | 5 |
| 21 | | | 828 | | | | | |
| 24 | 1,952 | 110 | 337,891 | 18.1 | 55.0 | 12.0 | 14.9 | 0 |
| 26 | 2,150 | 152 | 393,424 | 19.3 | 58.3 | 9.9 | 12.5 | 0.9 |
| 52 | | | 6,309 | | | | | |
| 58 | | | 49,224 | | | | | |
| A [2] | 1,952 | 250 | 55,533 | 24.6 | 73.8 | 0 | 1.6 | 5 |
| B [2] | 1,952 | 130 | 393,424 | 19.3 | 58.3 | 9.9 | 12.5 | 0.9 |

[1] Water content of inlet fresh gas not included in mol percent figures.
[2] A = Fresh gas leaving eighth wheel of second stage 22; B = Admixed recycle and fresh gases entering ninth wheel of second stage 22.

set of data represents a maximum allowable K factor for the corresponding temperature which will preclude the formation of solids by reaction of ammonia and carbon dioxide.

TABLE A

| Maximum K (Based on P in p.s.i.a.) | Corresponding Temperature | |
|---|---|---|
| | (° F.) | (° R.) |
| 20 | 30 | 490 |
| 112 | 70 | 530 |
| 345 | 100 | 560 |
| 945 | 130 | 590 |

From the data given in Table A, an empirical relationship between maximum K and the temperature is obtained which may be represented by the following equation (5)
$$\log K_{max} = -\frac{4828}{R} + 11.158$$

where R is the temperature in degrees Rankine and $K_{max}$ is the corresponding maximum allowable value of K which will preclude solids formation.

In general, the empirical relationship of Equation 5 provides a basis for estimating the allowable conditions of total pressure and concentration of ammonia and carbon dioxide which will preclude solids formation in a synthesis gas mixture at a given temperature, or conversely, for estimating the minimum temperature which will preclude solids formation in a synthesis gas mixture under given conditions of total pressure and concentrations of ammonia and carbon dioxide.

It should be noted in connection with Example I above and Example II following that conditions in the admixed streams are maintained well within the safe limits hereinabove set forth.

For example, the conditions set forth in Table I of Example I are evaluated in accordance with the above as follows:

(1) *Admixed recycle and fresh synthesis gases (line B) Table I*

Total Pressure = P = 1,952 p.s.i.g. = 1967 p.s.i.a.
Partial pressures of $$NH_3 = P_{NH_3} = X_{NH_3}P = .099(1967) = 195 \text{ p.s.i.a.}$$

Partial pressure of $$CO_2 = P_{CO_2} = X_{CO_2}P = 0.9 \times 10^{-6}(1967) = .00177 \text{ p.s.i.a.}$$

Substituting the values of $P_{NH_3}$ and $P_{CO_2}$ in Equation 4

$$K = (P_{HN_3})^2 P_{CO_2} = (195)^2(.00177) = 67.4$$

Substituting a temperature of 590° R. (130° F.) from Table I in Equation 5

$$\log K_{max} = -\frac{4828}{590} + 11.158 = 2.975$$

$$K_{max} = 945$$

It is thus seen that the maximum allowable K value ($K_{max}$) required to preclude solids formation at a temperature of 130° F. is 945, well above the actual K value of 67.4.

Alternatively, substituting the calculated K value of 67.4 in Equation 5

$$\log 67.4 = -\frac{4828}{R} + 11.158$$

$$R = \frac{4828}{11.158 - 1.829}$$

$$R = 518° \text{ R.} = 58° \text{ F.}$$

It is thus seen that the minimum temperature required to prevent solids formation under conditions yielding a K factor of 67.4 is 58° F., which is well below the actual temperature of 130° F.

Repeating these calculations with the data given in Example I for the admixed recycle and fresh synthesis gases after compression (line 26 of Table I) and for the admixed recycle and fresh synthesis gases of Example II, following, both before compression (line B of Table II, following) and after compression (line 26, Table II, following) yields the results tabulated in Table B below.

TABLE B

| | $K_1$ | $K_{max}$ | $T_1$,° F. | $T_{min}$,° F. |
|---|---|---|---|---|
| Line B, Table I | 67.4 | 945 | 130 | 58 |
| Line 26, Table I | 89.5 | 2,333 | 152 | 65.5 |
| Line B, Table II | 15 | 112 | 70 | 17.1 |
| Line 26, Table II | 19.8 | 345 | 100 | 24.6 |

$K_1$ = Calculated value of K from Equation 4.
$T_1$ = Temperature of the gas mixture.
$K_{max}$ = Maximum allowable K at temperature $T_1$.
$T_{min}$ = Minimum allowable temperature at $K_1$.

It is seen that conditions imposed upon the admixed gases are maintained throughout the process well within the limits set to preclude solids formation.

Reference is now made to FIGURE 2, which illustrates a modification of the process described with reference to FIGURE 2. The flow of fresh synthesis gas to second stage 22 of compressor 11 is the same as described for FIGURE 1. Recycle synthesis gas, obtained as hereinafter described, rich in unreacted nitrogen and hydrogen and containing residual ammonia and small amounts of impurities, is introduced via line 24 into a sidestream inlet of second stage 22 of compressor 11 wherein it is admixed with fresh synthesis gas. Fresh synthesis gas leaving the wheel next preceding the sidestream inlet is at a temperature of about 225° F. to about 325° F. and an intermediate pressure of about 1200 to about 2500 p.s.i.g. The recycle synthesis gas is at a temperature of about 10° F. to about 110° F. and a pressure of about 1200 to about 2500 p.s.i.g. The resultant admixed gases are at a temperature of about 40° F. to about 160° F. and a pressure of about 1200 to about 2500 p.s.i.g. as they enter the final wheel or wheels of second stage 22. The admixed gases are compressed to a final pressure of about 1400 to about 2700 p.s.i.g. and a final temperature of about 50° F. to about 200° F. by the final wheel or wheels and are withdrawn from second stage 22 via line 26, reduced in temperature in cooling zone 27 to condense residual ammonia present and introduced into secondary separation zone 31 where liquid ammonia is separated from the gaseous stream and passed via line 39 to holding tank 66. The remaining gaseous stream is withdrawn via line 32, heated in heat exchange zone 45 and introduced into converter 38, through line 33 for passage through converter heat exchanger 40. A portion of the relatively cool feed gas is fed through lines 34 and 35 between catalyst beds (not shown) for cooling the gaseous product stream.

The gaseous stream containing product ammonia and unreacted synthesis gas is withdrawn from converter 38 through line 42, cooled in heat exchange zone 45 against incoming synthesis gas to condense ammonia present and introduced into primary separator 49 where liquefied ammonia is separated and withdrawn through line 47 to holding tank 56. The remaining gaseous stream is withdrawn via line 24 and a major portion thereof, which consistutes the recycle synthesis gas hereinabove referred to, recycled to second stage 22 as aforesaid. A minor portion of the gaseous stream is diverted through line 51 to separator 50 in which residual ammonia is separated and withdrawn via line 54 to holding tank 56. The gaseous stream remaining after this separation is purged from the process via line 52 in order to prevent the accumulation of inerts in the system.

The modification of the process as set forth in FIGURE 2 essentially consists of separating the bulk of the product ammonia from the converter effluent prior to the effluent being recycled to second stage 22 and admixed and compressed with fresh synthesis gas. By contrast, the process of FIGURE 1 separates the ammonia only after admixture with fresh synthesis gas and compression. The invention is thus seen to be applicable to either mode of operation.

Example II below, sets forth a specific example of the operation of FIGURE 2 including operating conditions, composition and flow rate of key streams.

EXAMPLE II

First stage 12 and second stage 22 each contains nine compression wheels. The recycle synthesis gas is introduced between the eighth and ninth compression wheels of second stage 22.

TABLE II

| Ref. Fig. 2 | Press., p.s.i.g. | Temp., °F. | Flow Rate, lbs./hr. | Mol Percent $N_2$ | Mol Percent $H_2$ | Mol Percent $NH$ | Mol Percent inerts | Vol., p.p.m. $CO_2$ |
|---|---|---|---|---|---|---|---|---|
| 10 [1] | 380 | 80 | 94,711 | 24.6 | 73.8 | 0 | 1.6 | 5 |
| 14 [1] | 925 | 315 | 94,711 | 24.6 | 73.8 | 0 | 1.6 | 5 |
| 20 | 915 | 47 | 91,603 | 24.6 | 73.8 | 0 | 1.6 | 5 |
| 21 | | | 3,108 | | | | | |
| 24 | 1,980 | 37 | 489,248 | 19.6 | 59.0 | 5.4 | 16.0 | 0 |
| 26 | 2,150 | 100 | 580,851 | 20.5 | 61.9 | 4.4 | 13.2 | 1.0 |
| 52 | | | 9,692 | | | | | |
| 58 | | | 81,911 | | | | | |
| A [2] | 1,980 | 250 | 91,603 | 24.6 | 73.8 | 0 | 1.6 | 5 |
| B [2] | 1,980 | 70 | 580,851 | 20.5 | 61.9 | 4.4 | 13.2 | 1.0 |

[1] Water content of inlet fresh gas not included in mol percent figures.
[2] A = Fresh gas leaving eighth wheel of second stage 22; B = Admixed recycle and fresh gases entering ninth wheel of second stage 22.

It is seen from the above discussion and examples that the invention is generally accomplished by recycling unreacted reactants and admixing them under pressure, in a single piece of compression equipment, with fresh reactants and compressing the admixed stream to a desired pressure. The invention is particularly applicable to the production of synthetic ammonia as described herein. Obviously, however, it need not be limited thereto but may be applied to any process requiring the recycling of reactants and their reintroduction with fresh reactants into a pressurized reaction zone, such as, for example, the synthesis of methanol from hydrogen and carbon monoxide.

It will be apparent to those skilled in the art that many modifications and alterations may be made to the process described herein without departing from the spirit or scope of the present invention. The invention is not to be limited by the specific description and examples set forth, but it should be understood that the invention is defined in the accompanying claims.

What is claimed is:

1. A process for the synthesis at elevated pressures of a compound from reactants contained in a synthesis gas wherein less than the entire amount of reactants present in said synthesis gas react to form said compound and the unreacted portion of said reactants is recycled to a reaction zone which comprises introducing fresh synthesis gas containing said reactants into a compressor through the compressor intake and compressing said fresh synthesis gas to an intermediate pressure, introducing recycle synthesis gas at substantially said intermediate pressure and containing said compound, obtained as hereinafter defined, into said compressor downstream of said compressor intake, admixing and compressing said fresh and recycle synthesis gases in said compressor to a final elevated pressure, withdrawing thus admixed and compressed gases and separating said compound therefrom, passing remaining admixed and compressed gases to said reaction zone wherein a portion of said reactants react to form said compound, and passing the effluent from said reaction zone as said recycle synthesis gas to said compressor, said recycle synthesis gas being passed to said compressor at substantially the same pressure at which it emerges from said reaction zone.

2. The process of claim 1 in which a portion of said compound is separated from effluent of said reaction zone prior to recycling same.

3. A process for the synthesis at elevated pressures of ammonia from hydrogen and nitrogen contained in a synthesis gas wherein less than the entire amount of hydrogen and nitrogen present in said synthesis gas react to form ammonia and the unreacted portion of said reactants is recycled to a converter which comprises introducing fresh synthesis gas containing hydrogen and nitrogen into a compressor through the compressor intake and compressing said fresh synthesis gas to an intermediate pressure, introducing recycle synthesis gas at substantially said intermediate pressure and containing ammonia, obtained as hereinafter defined, into said compressor downstream of said compressor intake, admixing and compressing said fresh and recycle synthesis gases in said compressor to a final elevated pressure, withdrawing thus admixed and compressed gases and separating ammonia therefrom, passing remaining admixed and compressed gases to said converter containing ammonia synthesis catalyst wherein a portion of the hydrogen and nitrogen react to form ammonia, and passing the effluent from said reaction zone as said recycle gas to said compressor, said recycle gas being passed to said compressor at substantially the same pressure at which it emerges from said converter.

4. The process of claim 3 in which the admixed fresh synthesis and recycle gases contain carbon dioxide impurity and the partial pressures of ammonia and carbon dioxide and the temperatures are such that the relationship $$\log K_{max} = -\frac{4828}{R} + 11.158$$

is satisfied throughout the compression of said admixed gases, where R is the temperature of the admixed gases in degrees Rankine and $K_{max}$ is greater than the value of K determined by the relationship $$K = (P_{NH_3})^2 P_{CO_2}$$

in which $P_{NH_3}$ is the partial pressure of ammonia calculated as the mathematical product of the mol fraction of ammonia in the admixed gases and the total pressure in lbs. per square inch absolute, and $P_{CO_2}$ is the partial pressure of carbon dioxide calculated as the mathematical product of the mol fraction of carbon dioxide in the admixed gases and the total pressure in lbs. per square inch absolute.

5. The process of claim 3 in which fresh synthesis gas contains carbon dioxide and is at a pressure of about 1200 p.s.i.g. to about 3000 p.s.i.g. and a temperature of about 225° F. to about 325° F. immediately prior to admixture with said recycle synthesis gas, said recycle synthesis gas is at a pressure of about 1200 p.s.i.g. to about 3000 p.s.i.g. and a temperature of about 85° F. to about 185° F. immediately prior to admixture with said fresh synthesis gas, and said fresh synthesis gas and said recycle synthesis gas are admixed and compressed to a final pressure of about 1400 p.s.i.g. to about 3200 p.s.i.g. and a final temperature of about 100° F. to about 225° F.

6. The process of claim 3 in which said compressor is a multi-wheel centrifugal compressor having a fresh synthesis gas intake at the low pressure end of said compressor, having an admixed gas outlet at the high pressure end of said compressor, and having a recycle synthesis gas sidestream inlet between said intake and said outlet.

7. The process of claim 3 in which a portion of said ammonia is separated from effluent of said converter prior to recycling same.

8. The process of claim 7 in which the admixed fresh synthesis and recycle gases contain carbon dioxide impurity and the partial pressures of ammonia and carbon dioxide and the temperatures are such that the relationship $$\log K_{max} = -\frac{4828}{R} + 11.158$$

is satisfied throughout the compression of said admixed gases, where R is the temperature of the admixed gases in degrees Rankine and $K_{max}$ is greater than the value of K determined by the relationship $$K = (P_{NH_3})^2 P_{CO_2}$$

in which $P_{NH_3}$ is the partial pressure of ammonia calculated as the mathematical product of the mol fraction of ammonia in the admixed gases and the total pressure in lbs. per square inch absolute, and $P_{CO_2}$ is the partial pressure of carbon dioxide calculated as the mathematical product of the mol fraction of carbon dioxide in the admixed gases and the total pressure in lbs. per square inch absolute.

9. The process of claim 7 in which said fresh synthesis gas contains carbon dioxide and is at a pressure of about 1200 p.s.i.g. to about 2500 p.s.i.g. and a temperature of about 225° F. to about 325° F. immediately prior to admixture with said recycle synthesis gas, said recycle synthesis gas is at a pressure of about 1200 p.s.i.g. to about 2500 p.s.i.g. and a temperature of about 10° F. to about 110° F. immediately prior to admixture with said fresh synthesis gas, and said fresh synthesis gas and said recycle synthesis gas are admixed and compressed to a final pressure of about 1400 p.s.i.g. to about 2700 p.s.i.g. and a final temperature of about 50° F. to about 200° F.

10. The process of claim 7 in which said compressor is a multi-wheel centrifugal compressor having a fresh synthesis gas intake at the low pressure end of said compressor, having an admixed gas outlet at the high pressure end of said compressor, and having a recycle synthesis gas sidestream inlet between said intake and said outlet.

References Cited
UNITED STATES PATENTS

| | | | |
|---|---|---|---|
| 1,570,485 | 1/1926 | Harter | 23—199 |
| 1,931,678 | 10/1933 | Porter | 23—199 |
| 3,054,660 | 9/1962 | Crooks et al. | 23—199 |

OSCAR R. VERTIZ, *Primary Examiner.*

J. J. BROWN, H. S. MILLER, *Assistant Examiners.*

UNITED STATES PATENT OFFICE
CERTIFICATE OF CORRECTION

Patent No. 3,350,170                    October 31, 1967

James A. Finneran et al.

It is hereby certified that error appears in the above numbered patent requiring correction and that the said Letters Patent should read as corrected below.

Column 1, line 59, for "squipment" read -- equipment --; column 4, line 74, for "gases" read -- gaseous --; column 7, line 51, for "$1951^2$" read -- $(195)^2$ --; column 8, line 50, for "66" read -- 56 --; line 65, for "consistutes" read -- constitutes --; column 9, TABLE II, in the heading to the seventh column, line 4 thereof, for "NH" read -- $NH_3$ --.

Signed and sealed this 7th day of January 1969.

(SEAL)
Attest:

Edward M. Fletcher, Jr.                EDWARD J. BRENNER
Attesting Officer                      Commissioner of Patents